(12) United States Patent
Ryang

(10) Patent No.: US 7,264,874 B2
(45) Date of Patent: *Sep. 4, 2007

(54) PREPARATION OF METAL CHALCOGENIDE NANOPARTICLES AND NANOCOMPOSITES THEREFROM

(75) Inventor: Hong-Son Ryang, Camarillo, CA (US)

(73) Assignee: APS Laboratory, Camarillo, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 11/020,620

(22) Filed: Dec. 22, 2004

(65) Prior Publication Data

US 2006/0135669 A1 Jun. 22, 2006

(51) Int. Cl.
B32B 5/16 (2006.01)

(52) U.S. Cl. ..................... 428/402; 977/773

(58) Field of Classification Search .............. 428/402, 428/403; 75/371; 977/734, 773
See application file for complete search history.

(56) References Cited

U.S. PATENT DOCUMENTS

| | | | |
|---|---|---|---|
| 4,980,427 A | 12/1990 | Ryang | |
| 5,908,608 A * | 6/1999 | Lawandy et al. | 423/509 |
| 5,962,608 A | 10/1999 | Ryang et al. | |
| 6,169,119 B1 | 1/2001 | Ryang et al. | |
| 6,261,687 B1 | 7/2001 | Ryang et al. | |
| 6,500,871 B1 | 12/2002 | Gerardin et al. | |
| 6,579,472 B2 | 6/2003 | Chung et al. | |
| 6,838,486 B2 * | 1/2005 | Ryang | 516/90 |
| 6,911,081 B2 * | 6/2005 | Andriessen | 117/68 |
| 6,955,771 B2 * | 10/2005 | Ryang | 252/389.31 |
| 2001/0056141 A1 | 12/2001 | Schutt | |
| 2003/0024432 A1 | 2/2003 | Chung et al. | |
| 2003/0125883 A1 | 7/2003 | Kato et al. | |
| 2003/0133890 A1 | 7/2003 | Kauffman et al. | |
| 2003/0144469 A1 | 7/2003 | Kauffman et al. | |

OTHER PUBLICATIONS

Froment et al, "Metal chalcogenide semiconductors growth from aqueous solutions", Pure & Appl. chem., vol. 69, No. 1, pp. 77-82, 1997.*

Fitzgerald, et al, "Amorphous Chalcogenide/Metal bilayers—A new X-ray mask material", Central Laser Facility, Annual report 2002/2003, p. p. 151-152.*

International Search Report for PCT/US04/00323 filed on Jan. 7, 2004, Date of Mailing May 7, 2004.

International Search Report for PCT/US05/46235 dated Dec. 18, 2006.

* cited by examiner

Primary Examiner—H. Thi Le
(74) Attorney, Agent, or Firm—Amin, Turocy & Calvin, LLP

(57) ABSTRACT

Disclosed are metal chalcogenide nanocomposites made of guest metal chalcogenide precursors and host metal oxide sols made by mixing at least one metal alkoxide, at least one organosilane, at least one boron oxide compound, and a liquid, and chalcogenizing the mixture. Also disclosed are dielectric nano-composites containing a dielectric material such as a polymer and the metal chalcogenide nanocomposites.

29 Claims, No Drawings

PREPARATION OF METAL CHALCOGENIDE NANOPARTICLES AND NANOCOMPOSITES THEREFROM

FIELD OF THE INVENTION

The present invention generally relates to metal oxide sol hosted metal chalcogenide nanoparticles, polymers containing the metal oxide sol hosted guest metal chalcogenide nanoparticles, and related methods. In particular, the present invention relates to stable nanocomposites of host metal oxide sols and guest metal chalcogenide nanoparticles that can be uniformly incorporated into a dielectric matrix.

BACKGROUND OF THE INVENTION

In the last century, synthetic polymers have revolutionized the way in which we live. From synthetic rubber used in tires, structural plastic used in transportation systems, to field responsive polymers used in optical and electrical devices, synthetic polymers are used everywhere. A myriad of products and components for products are made, at least in part, of a polymer material. As the uses for polymers continue to increase, it becomes more and more desirable to improve the properties of polymers.

For example, silica, graphite, carbon black, and clay among many other materials have been incorporated into polymers in attempts to improve the properties of the resultant composites. While improvements have been realized, further improvements are desired.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention provides very stable nanocomposites of host metal oxide sols and guest metal chalcogenide nanoparticles having a controlled particle size. The stable nanocomposites can be uniformly incorporated into various dielectrics such as polymer systems on a molecular level thereby improving one or more of the dielectric properties. The present invention thus also provides dielectric compositions with one or more of improved strength, improved corona resistance, improved plasma resistance, improved resistance to organic solvents, improved high temperature stability, improved flame retardancy, improved oxidative stability, refractive index modification, improved fracture properties, improved abrasion resistance, improved liquid permeability, improved gas permeability including improved gas permeability to specific gases, improved (low) hysteresis loss (low rolling resistance), improved corrosion protection, improved optical and electrical performance, and the like. When used with a translucent polymer or translucent glass, the resulting polymer or glass composition remains clear or translucent.

One aspect of the invention relates to a nanocomposite containing at least one guest metal chalcogenide nanoparticle, such as a noble or non-noble metal chalcogenide nanoparticle, and host metal oxide sols made by mixing at least one metal alkoxide; at least one organosilane; at least one boron oxide compound; and a liquid.

Another aspect of the invention relates to a dried nanocomposite containing at least one guest metal chalcogenide nanoparticle, at least one metal alkoxide; at least one organosilane; and at least one boron oxide compound, with substantially no liquid/water. The dried nanocomposite is typically in powder form.

Yet another aspect of the invention relates to dielectric composites containing a dielectric material and a nanocomposite substantially uniformly dispersed therein.

Still yet other aspects of the invention relate to methods of making a metal chalcogenide nanocomposite involving mixing at least one guest metal chalcogenide precursor; at least one metal alkoxide; at least one organosilane; at least one boron oxide compound; and a liquid to provide the host-guest metal oxide sol, and chalcogenizing the host-guest metal oxide sol to provide metal chalcogenide nanocomposite.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The stable nanocomposites of the present invention contain host metal oxide sols and guest metal chalcogenide nanoparticles, such as noble or non-noble metal chalcogenide nanoparticles. Although not wishing to be bound by any theory, it is believed that the metal oxide sols act as hosts for individual guest metal chalcogenide atoms and clusters of guest metal chalcogenide atoms. Extensive aggregation and/or precipitation of guest metal chalcogenides is thereby mitigated. The host metal oxide sols also play an important role in improving the compatibility of the resulting metal chalcogenide nanocomposites with dielectric materials. The nanocomposites can be stored in a stable manner in liquid/sol form or in powder/dry form. The nanocomposites are thermally stable, thereby facilitating their use in dielectric systems.

The host metal oxide sols are prepared by combining certain relative amounts at least three components: at least one metal alkoxide compound, at least one organosilane, and at least one boron oxide compound with a liquid such as water and/or an organic solvent. The metal oxide sols contribute to the stability of the nanocomposites; that is, at least partly owing to the presence of the metal oxide sols the nanocomposites are stable over a long period of time, may be stored in a dry state, and are compatible with dielectrics such as polymer systems.

A "sol", as the term is used herein, refers to a composition containing a liquid colloidal dispersion containing a liquid phase and a dispersed phase. The liquid phase of the liquid colloidal dispersion may be aqueous and/or organic.

The liquid phase may also be a liquid or partially liquid substance to which a metal oxide sol can be added, such as resin monomers. For example, in the case where it is desired to incorporate nanocomposites into a polymer, the liquid phase of the metal oxide sols may be constituted by a polymer monomer in liquid form. A "dried sol" or "dried nanocomposite" results when the liquid phase of a sol is removed.

The term "hydrocarbyl" as used herein includes hydrocarbon as well as substantially hydrocarbon groups. Substantially hydrocarbon describes groups which contain heteroatom substituents which do not alter the predominantly hydrocarbon nature of the group. Examples of hydrocarbyl groups include hydrocarbon substituents, i.e., aliphatic (e.g., alkyl or alkenyl) and substituted aliphatic substituents, alicyclic (e.g., cycloalkyl, cycloalkenyl) substituents, aromatic-, aliphatic- and alicyclic-substituted aromatic substituents, fluorocarbon groups, polysiloxanes, and alkylates. Heteroatoms include, by way of example, fluorine, nitrogen, oxygen, silicon, phosphorus, and sulfur.

Metal oxide compounds include a metal and at least one alkoxide group or carboxylate group. Metal oxides include metal methoxides, metal ethoxides, metal isopropoxides, metal propoxides, metal butoxides, metal ethylhexoxides, metal (triethanolaminato)isopropoxides, chelated metal alkoxides such as metal bis(2,4-pentanedionate)diisopropoxides, metal bis(ethyl acetoacetato)diisopropoxides, and metal trifluoroacetylacetonates. Metal oxides also include at least one of transition metal alkoxides, post-transition metal alkoxides, alkali metal alkoxides, and alkaline earth metal alkoxides.

The metal of the metal oxide compounds include at least one transition metal and/or alkaline earth metal and combinations thereof. Transition metals include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Post-transition metals include Al, Ga, In, Tl, Ge, Sn, Pb, Sb, Bi, and Po. Alkali metals include Li, Na, K, Rb and Cs. Alkaline earth metals include Be, Mg, Ca, Sr and Ba. In one embodiment, the metal of the metal oxide compound is at least one of aluminum, titanium and zirconium.

Metal oxide compounds are commercially available or can be made from precursor compounds such as transition metal halides, alkaline earth metal halides, post-transition metal halides, alkali metal halides, transition metal carboxylates, alkaline earth metal carboxylates, post-transition metal carboxylates, alkali metal carboxylates, transition metal nitrates, alkaline earth metal nitrates, post-transition metal nitrates, and alkali metal nitrates.

In one embodiment, metal oxide compounds can be represented by Formula I:

$$M_aO_k(OR)_b \qquad (I)$$

wherein each M is a transition metal, alkaline earth metal, post-transition metal, or alkali metal, each R is independently a hydrogen or a hydrocarbyl group containing from 1 to about 18 carbon atoms (at least one R is a hydrocarbyl group), a is from 1 to about 5, k is 0 to about 10, and b is from 1 to about 20. In some instances, R may be a hydrogen atom provided that at least one or at least two Rs are hydrocarbyl groups containing from 1 to about 8 carbon atoms. In another embodiment, each R is independently a hydrocarbyl group containing from 1 to about 6 carbon atoms, a is from 1 to about 4, k is from 0 to about 3, and b is from 1 to about 6. In yet another embodiment, each R is independently a hydrocarbyl group containing from 1 to about 4 carbon atoms, a is from 1 to about 3, and b is from 1 to about 4.

Specific examples of metal oxide compounds include aluminum triethoxide, aluminum isopropoxide, aluminum sec-butoxide, aluminum tri-t-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium (triethanolaminato)isopropoxide, titanium bis(ethyl acetoacetato)diisopropoxide, titanium bis(2,4-pentanedionate)diisopropoxide, zirconium ethoxide, zirconium isopropoxide, zirconium propoxide, zirconium sec-butoxide, zirconium t-butoxide, aluminum di-s-butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxide, titanium n-nonyloxide, vanadium tri-n-propoxide oxide, vanadium triisobutoxide oxide, iron ethoxide, tungsten ethoxide, samarium isopropoxide, lanthanum methoxyethoxide, and combinations of two or more of the above compounds.

Metal hydroxides and metal salts such as metal carboxylates, metal halides, and metal nitrates may also be added as the metal oxide compound to make the metal oxide sols. Metal carboxylates include metal acetates, metal ethylhexanoates, metal gluconates, metal oxalates, metal propionates, metal pantothenates, metal cyclohexanebutyrates, metal bis(ammonium lacto)dihydroxides, metal citrates, and metal methacrylates. The metals are the same metals as the metal alkoxides. Specific examples of metal carboxylates include aluminum lactate, calcium acetate, calcium ethylhexanoate, calcium gluconate, calcium oxalate, calcium propionate, calcium pantothenate, calcium cyclohexanebutyrate, cobalt methoxyethoxide, cobalt acetate, iron alkoxide, iron isopropoxide, magnesium acetate, magnesium methylcarbonate, magnesium gluconate, nickel acetate, tin acetate, tin oxalate, titanium bis(ammonium lacto)dihydroxide, zinc acetate, zinc methacrylate, zinc stearate, zinc cyclohexanebutyrate, zirconium acetate, and zirconium citrate.

Organosilanes include compounds represented by Formula II:

$$(R^2)_{4-c}Si(X)_c \qquad (II)$$

wherein c is 2 to about 4, each $R^2$ is individually a hydrogen or an organofunctional containing organic group containing from about 1 to about 24 carbon atoms including at least one from the group consisting of heterocyclic, acryloxy, cyano, phosphino, amino, amide, vinyl, epoxy, glycidoxy, alkyl, a carbon carbon triple bond containing group, mercapto, siloxy, halocarbon such as fluorocarbon, and a carbon carbon double bond containing group, and each X is individually a hydrocarbyloxy or alkoxy group containing from 1 to about 8 carbon atoms, or chlorine, bromine, or iodine. Examples of alkoxy groups include methoxy, ethoxy, propoxy and butoxy groups.

Examples of organosilanes include tetramethoxysilane, tetraethoxysilane, tetrapropoxysilane, tetra-n-butoxysilane, and the like, and organofunctional silanes.

Organosilanes include organofunctional silanes, which are compounds represented by Formula III:

$$(R^2)_{4-c}Si(X^2)_c \qquad (III)$$

but wherein c is 1 to 4, each $X^2$ is individually an alkoxy group containing from 1 to about 4 carbon atoms, and each $R^2$ is individually a hydrogen or an organofunctional containing organic group containing from about 1 to about 24 carbon atoms including at least one from the group consisting of heterocyclic, acryloxy, cyano, phosphino, amino, amide, vinyl, epoxy, glycidoxy, alkyl, a carbon carbon triple bond containing group, mercapto, siloxy, halocarbon such as fluorocarbon, and a carbon carbon double bond containing group. In another embodiment, c is 2 or 3, $X^2$ is individually an alkoxy group containing from 1 to about 2 carbon atoms, and each $R^2$ is individually an organofunctional containing organic group containing from about 2 to about 8 carbon atoms.

When an organofunctional containing organic group ($R^2$) is contained by the organosilane, the particular functional group is selected so that it is compatible with the polymer in which the metal oxide sols may be incorporated. Specific examples of heterocyclic groups include substituted and unsubstituted pyrroles, pyrazoles, imidazoles, pyrrolidines, pyridines, pyrimidines, oxazoles, thiazoles, furans, thiophenes, dithianes, and isocyanurates. Specific examples of acryloxy groups include acryloxy, alkylacryloxy groups such as methacryloxy, and the like. Specific examples of carbon carbon double bond containing groups include alkenyl, cyclopentadienyl, styryl, and phenyl.

Further examples of organosilanes include phenyltrimethoxysilane; phenyltriethoxysilane; diphenyldimethoxysilane; diphenyldiethoxysilane; 3-aminopropyltrimethoxysilane; 3-aminopropyltriethoxysilane; N-(3-trimethoxysilylpropyl)pyrrole; N-[3-(triethoxysilyl)propyl]-4,5-dihydroimidazole; beta -trimethoxysilylethyl-2-pyridine; N-phenylaminopropyltrimethoxysilane; 3-(N-styrylmethyl-2-aminoethylamino)propyltrimethoxysilane; methacryloxy-propenyltrimethoxysilane; 3-methacryloxypropyltrimethoxysilane; 3-methacryloxypropyltris(methoxyethoxy)silane; 3-cyclopentadienylpropyltriethoxysilane; 7-oct-1-enyltrimethoxysilane, Prosil® 9214 from PCR, Inc. (a carboxy amide silane); 3-glycidoxypropyl-trimethoxysilane; gamma-glycidoxypropylmethyldimethoxysilane; gamma-glycidoxypropylpylpentamethyidisiloxane; gamma-glycidoxypropylmethyidiethoxysilane; gamma-glycidoxypropyldimethylethoxysilane; (gamma-glycidoxypropyl)-bis-(trimethylsiloxy)methylsilane; vinylmethyldiethoxysilane; vinylmethyidimethoxysilane; methylaminopropyltrimethoxysilane; n-octyltriethoxysilane; n-octyltrimethoxysilane; hexyltriethoxysilane; isobutyltrimethoxysilane; 3-ureidopropyltriethoxysilane; 3-isocyanatepropyltriethoxysilane; N-phenyl-3-aminopropyltrimethoxysilane; 3-triethoxysilyl-N-(1,3-dimethyl-butyliden) propylamine; N-2(aminoethyl)3-aminopropyltriethoxysilane; N-2(aminoethyl)3-aminopropyltrimethoxysilane; N-2(aminoethyi)3-aminopropylmethyidimethoxysilane; 3-acryloxypropyltrimethoxysilane; methacryloxypropylmethyldiethoxysilane; methacryloxypropylmethyidimethoxysilane; glycidoxypropylmethyldiethoxysilane; 2-(3,4 epoxycyclohexyl)-ethyltrimethoxysilane; vinyltrimethoxysilane; vinyltriethoxysilane; amonophenyltrimethoxysilane; triethoxysilane; p-chloromethyl)phenyltri-n-propoxysilane; diphenylsilanediol; 2-(3,4-epoxycyclohexyl) ethyltrimethoxysilane; epoxyhexyltriethoxysilane; tris(3-trimethoxysilylpropyl)isocyanurate; dococentyltrimethoxysilane; 3-mercaptopropyltriethoxysilane; 1,4-bis(trimethoxysilylethyl)benzene; phenylsilane; trimethoxysilyl-1,3-dithiane; n-trimethoxysilylpropylcarbamoylcaprolactam; 2-(diphenylphosphine)ethyltriethoxysilane, 3-cyanopropyltrimethoxysilane, diethylphosphatoethyltriethoxysilane, and the like.

Organosilanes are commercially available from a number of sources including under the trade designation Prosil® from Clariant and from ShinEtsu among others, or they may be prepared from organosilane precursor compounds such as corresponding halosilanes, such as vinyltrichlorosilane.

Boron oxide compounds contain at least boron and oxygen atoms. Boron oxide compounds include boric acid ($B(OH)_3$), alkoxy boron compounds (or boron alkoxides), hydrocarbyl boric acids, hydrocarbyl hydroxy boron alkoxides, and hydroxy boron alkoxides. In one embodiment, boron oxide compounds can be represented by Formula IV:

$$B(OH)_d(OR)_{3-d} \qquad (IV)$$

wherein each R is independently a hydrocarbyl group containing from 1 to about 8 carbon atoms, and d is from 0 to about 3. In another embodiment, each R is independently a hydrocarbyl group containing from 1 to about 4 carbon atoms, and d is from 1 to about 2. In yet another embodiment, boron oxide compounds can be represented by Formula V:

$$B(OH)_e(OR)_f(R^3)_{3-(e+f)} \qquad (V)$$

wherein each R is independently a hydrocarbyl group containing from 1 to about 8 carbon atoms, each $R^3$ is independently a hydrocarbyl group containing from 1 to about 24 carbon atoms, e is from 0 to about 3, and f is from 0 to about 3. In still yet another embodiment, each R is independently a hydrocarbyl group containing from 1 to about 4 carbon atoms and each $R^3$ is independently a hydrocarbyl group containing from 1 to about 10 carbon atoms.

Specific examples of boron oxide compounds include boric acid, boron tri-n-butoxide, boron tri-sec-butoxide, boron tri-t-butoxide, boron triisopropoxide, boron tri-n-propoxide, boron trimethoxide, boron triethoxide, hydroxy boron diisopropoxide, hydroxy boron diethoxide, hydroxy boron dimethoxide, hydroxy boron dibutoxide, dihydroxy boron isopropoxide, dihydroxy boron ethoxide, dihydroxy boron methoxide, dihydroxy boron butoxide, phenylboronic acid, 3-acetylphenylboronic acid, 4-acetylphenylboronic acid, 5-chlorothiophene-2-boronic acid, 1,4-phenylenebis (boronic acid), (2-carboxyphenyl)boronic acid, (3-carboxyphenyl)boronic acid, (4-carboxyphenyl)boronic acid, (3,4-methylenedioxyphenyl)boronic acid, 4-methylthio) phenylboronic acid, naphthalene-1-boronic acid, naphthalene-2-boronic acid, 8-quinolineboronic acid, benzothiophene-2-boronic acid, (2-acetylaminophenyl)boronic acid, (3-acetylaminophenyl)boronic acid, 4-acetylaminophenyl)boronic acid, (3-methoxycarbonylphenyl)boronic acid, (4-methoxycarbonylphenyl)boronic acid, (4-methyl-1-naphthalene)boronic acid, and the like.

Boric oxide and boric acids are commercially available. For example, boric acids are available from Aldrich, Acros Organics, and Ryscor Science, Inc. Boron alkoxides and hydroxy boron alkoxides can be synthesised by the dehydration of mixtures of alcohol with boric oxide or boric acid. For example, boric acid and ethanol can be used to synthesise boron triethoxide.

The metal oxide sols are prepared by combining the metal alkoxide, the organosilane, and the boron oxide compound in any suitable order with a liquid such as water and/or an organic solvent. In this connection, the metal alkoxide, the organosilane, and the boron oxide compound may be simultaneously combined; the metal alkoxide and the organosilane may be initially combined, followed by addition of the boron oxide compound; the metal alkoxide and the boron oxide compound may be initially combined, followed by addition of the organosilane; or the boron oxide compound and the organosilane may be initially combined, followed by addition of the metal alkoxide.

The metal alkoxide, organosilane, and boron oxide compound are combined in a liquid. The liquid is at least one of water and an organic solvent. In one embodiment, the metal alkoxide, organosilane, and boron oxide compound are combined in a mixture of water and at least one organic solvent. In another embodiment, the metal alkoxide, organosilane, and boron oxide compound are combined in an organic solvent, followed by addition of water. Irregardless of the liquid protocol, a certain minimum amount of water is desirably provided to facilitate formation of stable sols.

The minimum amount of water, in moles, can be determined based on the empirical equation of the sol formation. More specifically, in one embodiment, representing the reaction as follows:

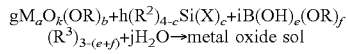
$$gM_aO_k(OR)_b + h(R^2)_{4-c}Si(X)_c + iB(OH)_e(OR)_f(R^3)_{3-(e+f)} + jH_2O \rightarrow \text{metal oxide sol}$$

where M, R, $R^2$, $R^3$, X, a, b, c, e, k, and f are as defined above, and g, h, i, and j are the number of moles of each component. In one embodiment, the minimum amount of water, and thus j, is determined using the following equation: $(gb+hc+if)/2$. That is, in the above reaction, $j \geq (gb+hc+if)/2$. In another embodiment, $j > (gb+hc+if)/2$. This minimum amount of water is referred to as a sol facilitating amount of water. The water may be added when combining the metal alkoxide, organosilane, and boron oxide compound with an organic solvent, or when combining the metal alkoxide, organosilane, and boron oxide compound with a polymer, or just after combining the three components with a polymer.

In some instances, water for hydrolysis is liberated by the boron compound, especially when a boron hydroxide compound is employed (when e in the reaction scheme is at least 1). In these instances, the water created lowers or eliminates the water requirement of $jH_2O$ in the reaction scheme above. Thus, in another embodiment, the minimum amount of water, and thus j, is determined using the following equation: $[(gb+hc+if)/2] - ie$. That is, in the above reaction, $j \geq [(gb+hc+if)/2] - ie$. A relatively low amount of water, and in some instances no or virtually no water can be employed when a boron hydroxide compound is employed. The presence of at least one boron hydroxide group can decrease the amount of water needed to promote the sol formation. The boron hydroxide group can provide water by reacting with any number of species including solvents, particularly alcohol solvents, metal alkoxide groups, and metal hydroxide groups.

For example, in another embodiment, the reaction scheme may be represented by:

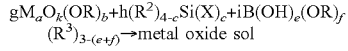
$$gM_aO_k(OR)_b + h(R^2)_{4-c}Si(X)_c + iB(OH)_e(OR)_f(R^3)_{3-(e+f)} \rightarrow \text{metal oxide sol}$$

where M, R, $R^2$, $R^3$, X, a, b, c, k, and f are as defined above, e is at least 1, b is preferably 1, and g, h, i, and j are the number of moles of each component.

In another example, in yet another embodiment, the reaction scheme may be represented by:

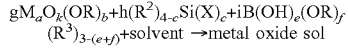
$$gM_aO_k(OR)_b + h(R^2)_{4-c}Si(X)_c + iB(OH)_e(OR)_f(R^3)_{3-(e+f)} + \text{solvent} \rightarrow \text{metal oxide sol}$$

where M, R, $R^2$, $R^3$, X, a, b, c, k, and f are as defined above, e is at least 1, and g, h, i, and j are the number of moles of each component. Preferably, the solvent in this reaction scheme contains at least some alcohol solvent.

Certain relative amounts of the metal alkoxide, organosilane, and boron oxide compounds are combined in order to facilitate the formation of stable metal oxide sols.

In one embodiment, from about 10 mole % to about 80 mole % of the metal alkoxide, from about 5 mole % to about 80 mole % of the organosilane, and from about 1 mole % to about 80 mole % of the boron oxide compound are combined to form the metal oxide sols. In another embodiment, from about 15 mole % to about 75 mole % of the metal alkoxide, from about 7 mole % to about 75 mole % of the organosilane, and from about 3 mole % to about 75 mole % of the boron oxide compound are combined to form the metal oxide sols. In yet another embodiment, from about 20 mole % to about 60 mole % of the metal alkoxide, from about 10 mole % to about 70 mole % of the organosilane, and from about 5 mole % to about 70 mole % of the boron oxide compound are combined to form the metal oxide sols.

In one embodiment, from about 15% to about 70% by weight of the metal alkoxide, from about 10% to about 75% by weight of the organosilane, and from about 0.5% to about 40% by weight of the boron oxide compound are combined to form the metal oxide sols. In another embodiment, from about 20 % to about 65% by weight of the metal alkoxide, from about 15% to about 70% by weight of the organosilane, and from about 0.7% to about 35% by weight of the boron oxide compound are combined to form the metal oxide sols. In yet another embodiment, from about 25% to about 60% by weight of the metal alkoxide, from about 20% to about 65% by weight of the organosilane, and from about 1% to about 30% by weight of the boron oxide compound are combined to form the metal oxide sols.

One or more of any suitable organic solvent may be employed to combine the metal alkoxide, organosilane, and boron oxide compounds. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like. The identity of the organic solvent is not critical to the present invention.

The metal alkoxide, organosilane, and boron oxide compounds are combined with water and/or an organic solvent at a temperature suitable to facilitate mixing and/or the formation of the metal oxide sols. In one embodiment, the temperature while combining components is maintained from about 15° C. to about 100° C. In another embodiment, the temperature while combining components is maintained from about 20° C. to about 90° C.

In one embodiment, the dried metal sols contain from about 15% to about 70% by weight of the metal alkoxide, from about 10% to about 75% by weight of the organosilane, and from about 0.5% to about 40% by weight of the boron oxide compound. In another embodiment, the dried metal sols contain from about 20% to about 65% by weight of the metal alkoxide, from about 15% to about 70% by weight of the organosilane, and from about 0.7% to about 35% by weight of the boron oxide compound. In yet another embodiment, the dried metal sols contain from about 25% to about 60% by weight of the metal alkoxide, from about 20% to about 65% by weight of the organosilane, and from about 1% to about 30% by weight of the boron oxide compound.

One or more guest metal chalcogenide precursors are combined with the metal oxide sols, or combined with one or more of the metal alkoxide, organosilane, boron oxide compounds, water and/or an organic solvent during formation of the metal oxide sols to provide the nanocomposites containing the host metal oxide sols and guest metal chalcogenide precursors. For example, the guest metal chalcogenide precursors may be simultaneously combined with the metal alkoxide, the organosilane, and the boron oxide compound (combine all four components, then hydrolyze); the metal alkoxide, the organosilane, and the liquid are initially combined, followed by adding the guest metal chalcogenide precursor, and further followed by adding the boron oxide compound; the metal alkoxide, the organosilane, the boron oxide compound, and the liquid are initially combined, followed by adding the guest metal chalcogenide precursor; the metal alkoxide, the guest metal chalcogenide precursor, and the liquid are initially combined, followed by adding the organosilane, and further followed by adding the boron compound; the metal alkoxide, the guest metal chalcogenide precursor are initially combined, followed by adding boron oxide compound, and further followed by adding the organosilane.

The use of chelating compounds can effectively help control the particle size of guest metal chalcogenide nanoparticles. They include silanes having a chelating group such as mercapto, amino, cyano, amide, phosphino, or heterocyclic group and non-silane chelating compounds such as alkylthiols, arylthiols, alkylamines, arylamines, alkylcarboxylic acids, arylcarboxylic acids, arylphosphines, alkylphosphines, and the like. They can be added during the preparation of host metal oxide sols or host-guest metal oxide sols.

Boron compound is needed to prepare the metal oxide sol but can be removed once the metal oxide sol is prepared. A metal oxide sol without boron oxide also can be used as a host for metal chalcogenide nanoparticles. If desired, the boron oxide can be removed anytime from a metal oxide sol including before or after making a host-guest metal oxide sol and after chacogenizing the guest metal chalcogenide precursor.

Guest metal chalcogenide precursors may include zero valence metal (e.g., metal carbonyls, metal olefins) and metal ions (e.g., metal alkoxides, metal hydroxides, metal carboxylates, metal nitrates, metal halides, metal sulfates, chelated metals). Examples of metals include aluminum, antimony, arsenic, barium, beryllium, bismuth, cadmium, calcium, cerium, chromium, cobalt, copper, dysprosium, erbium, europium, gadolinium, gallium, gold, hafnium, holmium, indium, iridium, iron, lanthanum, lead, lithium, lutetium, magnesium, manganese, mercury, molybdenum, neodymium, nickel, niobium, osmium, palladium, platinum, potassium, praseodymium, rhenium, rhodium, rubidium, ruthenium, samarium, scandium, silver, strontium, tantalum, technetium, terbium, titanium, thallium, thorium, thulium, tin, tungsten, uranium, vanadium, ytterbium, yttrium, zinc, zirconium. Examples of guest metal chalcogenide precursors include gold hydroxide, gold acetate, gold chloride, silver acetate, silver acetylacetonate, silver citrate, silver lactate, silver nitrate, platinum acetylacetonate, platinum chloride, palladium acetylacetonate, palladium acetate, palladium hydroxide, ruthenium acetylacetonate, copper acetate, copper ethoxide, iron hydroxide, cobalt hydroxide, zinc hydroxide, nickel hydroxide, cadmium hydroxide, iron acetate, cobalt acetate, zinc acetate, chromium acetate hydroxide, manganese acetate, molybdenum acetate, nickel acetate, lead acetate, cadmium acetate, iron chloride, cobalt chloride, zinc chloride, vanadium chloride, chromium chloride, manganese chloride, molybdenum chloride, nickel chloride, lead chloride, cadmium chloride, niobium chloride, tungsten chloride, iron acetylacetonate, cobalt acetylacetonate, zinc acetylacetonate, vanadyl acetylacetonate, chromium acetylacetonate, manganese acetylacetonate, molybdenum acetylacetonate, nickel acetylacetonate, lead acetylacetonate, cadmium acetylacetonate, niobium acetylacetonate, iron citrate, cobalt citrate, zinc citrate, nickel citrate, lead citrate, iron nitrate, cobalt nitrate, zinc nitrate, chromium nitrate, manganese nitrate, nickel nitrate, lead nitrate, cadmium nitrate, iron ethoxide, cobalt ethoxide, zinc ethoxide, vanadium ethoxide, chromium ethoxide, manganese ethoxide, molybdenum ethoxide, nickel ethoxide, lead ethoxide, cadmium ethoxide, niobium ethoxide, tungsten ethoxide, cerium methoxyethoxide, erbium acetate, europium acetoacetate, gallium ethoxide, hafnium n-butoxide, indium methoxyethoxide, mercury acetate, strontium acetate, tantalum n-butoxide, yttrium acetate, tin acetoacetate, $Fe(CO)_5$, $Fe_2(CO)_9$, $Co_2(CO)_8$, $ZnX(CO)Y$, $V(CO)_6$, $Cr(CO)_6$, $Mn_2(CO)_{10}$, $Re_2(CO)_{10}$, $Ru_3(CO)_{12}$, $Mo(CO)_6$, $Ni(CO)_4$, $Os(CO)_5$, $Os_3(CO)_{12}$, $Ir_4(CO)_{12}$, $W(CO)_6$, $Tc_2(CO)_{10}$, $Ru(CO)_5$, $Rh(CO)_{12}$, $Pd(CO)_4$, $Pt(CO)_4$, platinum-1,3-divinyl-1,1,3,3,-tetramethyldisiloxane, and the like. Guest metal chalcogenide precursors may include mixed metal chalcogenide precursors.

In one embodiment, from about 20% to about 99.99% by weight of the metal oxide sols and from about 0.01% to about 80% by weight of the guest metal chalcogenide precursors are combined to form the host-guest metal oxide sols. In another embodiment, from about 50% to about 99.95% by weight of the metal oxide sols and from about 0.05% to about 50% by weight of the guest metal chalcogenide precursors are combined to form the host-guest metal oxide sols. In yet another embodiment, from about 80% to about 99.9% by weight of the metal oxide sols and from about 0.1% to about 20% by weight of the guest metal chalcogenide precursors are combined to form the host-guest metal oxide sols.

The host-guest metal oxide sols may be stored in a wet or dry state. In the wet state, the metal alkoxide, organosilane, boron oxide compounds, guest metal chalcogenide precursors, and organic solvent and/or water are simply stored in a container. When storage in a wet state is employed, delivery and movement of the nanocomposites is facilitated by minimizing the amount of liquid. In one embodiment, the host-guest metal oxide sols may be stored in a wet state for at least about 6 months. In another embodiment, the host-guest metal oxide sols may be stored in a wet state for at least about 12 months. When stored in a wet state, flocculation is mitigated and/or eliminated. When stored in a wet or dy state, color changes are mitigated and/or eliminated.

When storing in a dry state, the host-guest metal oxide sols in the wet state are subject to an evaporation technique, with optional heating, to remove the liquids present. A vacuum may be employed. The resultant dry host-guest metal oxide sols are generally in a powder-like form. In one embodiment, the host-guest metal oxide sols may be stored in a dry state for at least about 6 months. In another embodiment, the host-guest metal oxide sols may be stored in a dry state for at least about 12 months.

In one embodiment, the dried host-guest metal oxide sols contain less than about 0.5% by weight water. In another embodiment, the dried host-guest metal oxide sols contain less than about 0.1% by weight water. In yet another embodiment, the dried host-guest metal oxide sols contain less than about 0.05% by weight water.

When storing in a dry state, the dried host-guest metal oxide sols can be heated up to about 180° C. for about 2 hours without degradation. Also when storing in a dry state, the dried host-guest metal oxide sols can be stored in at least a semi-airtight container, although this is not necessary. Due to the stability of the host-guest metal oxide sols, an advantage is that they may be stored in the open air without degradation as far as they are not exposed to chalcogenizing chemicals in air. This is because it is believed that the host-guest metal oxide sols resist water uptake and/or are stable to oxidation. It is another alternative to store the dried host-guest metal oxide sols in an airtight container or in a vacuum pack/state.

The host-guest metal oxide sols may be treated with a chalcogenizing agent at ambient temperature or at elevated temperatures to provide the metal chalcogenide nanocomposites. Chalcogenizing agents include sulfurization agents, selenization agents and tellurization agents. Hydrogen chalcogenides such as $H_2S$, $H_2Se$, and $H_2Te$ may be used. In addition, other chalcogenizing agents may be used which include labile metal-chalcogenides, elemental chalcogens, thioamide (e.g., methylthioamide), thioacetamide (e.g., methoxythioacetamide), thiourea, bis-(trimethylsilylsulfide), carbon disulfide, and the like. Labile metal-chalcogenides include $Al_2S_3$, $Al_2Se_3$, $Al_2Te_3$, $Na_2S$, $Na_2Se$, $Na_2Te$, CaS, CaSe, CaTe, FeS, FeSe, FeTe, $TiS_2$, $TiSe_2$, $TiTe_2$, $ZrS_2$, $ZrSe_2$, $ZrTe_2$, $B_2S_3$, $B_2Se_3$, and $B_2Te_3$. Elemental chalcogens include S, Se, and Te.

The chalcogenization treatment may be carried out either in solution form or in powder form of host-guest metal oxide sols. In one embodiment, the host-guest metal oxide sols in a wet state may be subject to chalcogenization treatment. The host-guest metal oxide sols may be dissolved in a liquid. The liquid may be water and/or an organic solvent. In one embodiment, the host-guest metal oxide sols are dissolved in an organic solvent. In another embodiment, the host-guest metal oxide sols are dissolved in a mixture of water and at least one organic solvent. In another embodiment, the host-guest metal oxide sols are dissolved in water, followed by addition of an organic solvent. In yet another embodiment, the host-guest metal oxide sols are dissolved in an organic solvent, followed by addition of water.

One or more of any suitable organic solvent may be employed to dissolve the host-guest metal oxide sols. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like. The identity of the organic solvent is not critical to the present invention.

The host-guest metal oxide sols may be dissolved in water and/or an organic solvent at a temperature suitable to facilitate mixing. In one embodiment, the temperature while combining components is maintained from about 20° C. to about 100° C. In another embodiment, the temperature while combining components is maintained from about 30° C. to about 90° C.

The host-guest metal oxide sols solution may be treated with a chalcogenizing agent. In one embodiment, chalcogenizing agent gas may be bubbled through the solutions. In another embodiment, the host-guest metal oxide sols solution may be combined with chalcogenizing agent solution.

The chalcogenization treatment may be carried out in powder form of host-guest metal oxide sol. The host-guest metal oxide sols powder may be exposed to a chalcogenizing agent. In one embodiment, the host-guest metal oxide sol powder may be exposed to a chalcogenizing agents gas.

The chalcogenization treatment may be carried out at a temperature suitable to facilitate chalcogenization. In one embodiment, the chalcogenization treatment is carried out at an ambient temperature. In another embodiment, the temperature while chalcogenization is maintained from about 20° C. to about 100° C. In another embodiment, the temperature while chalcogenization is maintained from about 30° C. to about 90° C.

The metal chalcogenide nanocomposites may be stored in a wet or dry state. In the wet state, the metal alkoxide, organosilane, boron oxide compounds, guest metal chalcogenide nanoparticles, and organic solvent and/or water are simply stored in a container. When storage in a wet state is employed, delivery and movement of the metal chalcogenide nanocomposites is facilitated by minimizing the amount of liquid. In one embodiment, the metal chalcogenide nanocomposites may be stored in a wet state for at least about 6 months. In another embodiment, the metal chalcogenide nanocomposites may be stored in a wet state for at least about 12 months. When stored in a wet state, flocculation is mitigated and/or eliminated. When stored in a wet or dy state, color changes are mitigated and/or eliminated.

When storing in a dry state, the metal chalcogenide nanocomposites in the wet state are subject to an evaporation technique, with optional heating, to remove the liquids present. A vacuum may be employed. The resultant dry metal chalcogenide nanocomposites are generally in a powder-like form. In one embodiment, the metal chalcogenide nanocomposites may be stored in a dry state for at least about 6 months. In another embodiment, the metal chalcogenide nanocomposites may be stored in a dry state for at least about 12 months.

In one embodiment, the dried metal chalcogenide nanocomposites contain less than about 0.5% by weight water. In another embodiment, the dried metal chalcogenide nanocomposites contain less than about 0.1% by weight water. In yet another embodiment, the dried metal chalcogenide nanocomposites contain less than about 0.05% by weight water.

When storing in a dry state, the dried metal chalcogenide nanocomposites can be heated up to about 180° C. for about 2 hours without degradation. Also when storing in a dry state, the dried metal chalcogenide nanocomposites can be stored in at least a semi-airtight container, although this is not necessary. Due to the stability of the metal chalcogenide nanocomposites, an advantage is that they may be stored in the open air without degradation. This is because it is believed that the metal chalcogenide nanocomposites resist water uptake and/or are stable to oxidation. It is another alternative to store the dried metal chalcogenide nanocomposites in an airtight container or in a vacuum pack/state.

The metal chalcogenide nanocomposites have a small size permitting uniform incorporation into a dielectric material. Since the metal chalcogenide nanocomposites can disperse within a medium such as a liquid or dielectric material without aggregation, the small size is retained after incorporation. The small size of the metal chalcogenide nanocomposites is controllable. In one embodiment, at least 50% by weight of the metal chalcogenide nanocomposites have a particle size from about 1 nm to about 250 nm, or a particle size of about 250 nm or less. In another embodiment, at least 50% by weight of the metal chalcogenide nanocomposites have a particle size from about 2.5 nm to about 100 nm, or a particle size of about 100 nm or less. In another embodiment, at least 50% by weight of the metal chalcogenide nanocomposites have a particle size from about 5 nm to about 50 nm, or a particle size of about 50 nm or less.

The controllable particle size is particularly advantageous because the presence of the metal chalcogenide nanocomposites in a medium such as dielectric material may induce color shifts. For example, generally smaller sized particles of the metal chalcogenide nanocomposites generate a blue color shift, while generally larger sized particles of the metal chalcogenide nanocomposites generate a red color shift. The ability to generate color shifts makes the metal chalcogenide nanocomposites suitable for use in various optical applications.

The metal chalcogenide nanocomposites may be incorporated into a dielectric material to form a dielectric composite, or they may be used in applications where the metal chalcogenide nanoparticles can be used, such as in sensor devices, catalysts, photonics devices, high density magnetic recording components, recording media, other magnetic applications, color filters, dyes, optical filters, hair coloring products, solar energy conversion, photocatalysis, electronics, nonlinear optics, electroluminescent displays, photoluminescent sensors, nanoelectronic devices, biological probes, light-emitting quantum dots, quantum dot lasers, and the like.

A dielectric composite contains at least a dielectric material and the metal chalcogenide nanocomposite. The dielectric composite may further contain optional additives. Additives can enhance nanocomposite-dielectric compatibility. The metal chalcogenide nanocomposites are incorporated into the dielectric matrix on a nanoscale basis in a substantially uniform manner (The metal chalcogenide nanocomposites are uniformly dispersed throughout the dielectric material). Generally speaking, dielectric materials include glasses, ceramics, polymers, and the like.

In one embodiment, dielectric composites of the present invention contain from about 1% by weight to about 99.99% by weight of the dielectric material and from about 0.01% by weight to about 99% by weight of the metal chalcogenide nanocomposite. In another embodiment, the dielectric composite contains a major amount of the dielectric material and a minor amount of the metal chalcogenide nanocomposite, and optionally a minor amount of additives. In another embodiment, dielectric composites of the present invention contain from about 20% by weight to about 99.9% by weight of the dielectric material and from about 0.1% by weight to about 80% by weight of the metal chalcogenide nanocomposite. In yet another embodiment, dielectric composites of the present invention contain from about 70% by weight to about 99% by weight of the dielectric material and from about 1% by weight to about 30% by weight of the metal chalcogenide nanocomposite. The dielectric composite is made by combining suitable amounts of the dielectric material and the metal chalcogenide nanocomposite.

A polymer composite contains at least a polymer and the metal chalcogenide nanocomposite. The polymer composite may further contain optional additives such as, for example, coupling agents (silane, titanium, or zirconium coupling agents), surfactants, and fillers. Additives can enhance nanocomposite-polymer compatibility. The metal chalcogenide nanocomposites are incorporated into the polymer matrix on a nanoscale basis in a substantially uniform manner (The metal chalcogenide nanocomposites are uniformly dispersed throughout the polymer). Generally speaking, polymers include thermosets, thermoplastics, synthetic rubbers, extrudable polymers, injection molding polymers, moldable polymers, and the like.

The polymer is any suitable material capable of forming a pre-polymer material, a partially polymerized material or a polymer, that incorporate the metal chalcogenide nanocomposites. The polymer may be polymer monomers, a B-staged polymer, or a polymer. In one embodiment, the polymer is at least one of a polyacrylate such as polymethylmethacrylate, an unsaturated polyester, a saturated polyester, a polyolefin (polyethylenes, polypropylenes, polybutylenes, and the like), an alkyd resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybemzoxazoles, polybenzthiazoles, polyfluorocarbones, polyphenylene ethers, polyarylates, cyanate ester polymers, copolymers of two or more thereof, and the like.

Suitable polymers include acrylic resins. Examples of acrylic monomers include monoacrylics, diacrylics, triacrylics, tetraacrylics, pentacrylics, etc. Examples of polyacrylates include polyisobornylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxyethylacrylate, poly-2-phenoxyethylmethacrylate, poly-2-ethylbutylmethacrylate, poly-9-anthracenylmethyl methacrylate, poly-4-chlorophenylacrylate, polycyclohexylacrylate, polydicyclopentenyloxyethyl acrylate, poly-2-(N,N-diethylamino)ethyl methacrylate, poly-dimethylaminoeopentyl acrylate, poly-caprolactone 2-(methacryloxy)ethylester, and polyfurfurylmethacrylate, poly(ethylene glycol)methacrylate, polyacrylic acid and poly(propylene glycol)methacrylate.

Examples of suitable diacrylates which can be used to form polyacrylates include 2,2-bis(4-methacryloxyphenyl) propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol dimethacrylate, 1,6-hexanediol diacrylate, neopentyl glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N -1,9-nonylene biscarbamate, 1,4-cycloheanedimethanol dimethacrylate, and diacrylic urethane oligomers (reaction products of isocyanate terminate polyol and 2-hydroethylacrylate).

Examples of triacrylates which can be used to form polyacrylates include tris(2-hydroxyethyl )isocyanu rate trimethacrylate, tris(2-hydroxyethyl )isocyanu rate triacrylate, trimethylolpropane trimethacrylate, trimethylolpropane triacrylate and pentaerythritol triacrylate. Examples of tetracrylates include pentaerythritol tetraacrylate, di-trimethylopropane tetraacrylate, and ethoxylated pentaerythritol tetraacrylate. Examples of pentaacrylates include dipentaerythritol pentaacrylate and pentaacrylate ester.

Polyacrylates include other aliphatically unsaturated organic compounds, such as polyacrylamides and unsaturated polyesters, which are condensation products of unsaturated dicarboxylic acids and diols, and vinyl compounds, or compounds having a terminal double bond. In one embodiment, these materials are co-cured with the acrylic component by free radical technique. Examples of vinyl compounds include N-vinylpyrrollidone, styrene, vinyl naphthalene and vinylphtalimide. Polyacrylamides (including poly(meth)acrylamide derivatives) are commercially available. Some of the particular (meth)acrylamide derivatives useful in the present invention include N-alkyl- or N-alkylene-substituted or unsubstituted (meth)acrylamides. Specific examples thereof are acrylamide, methacrylamide, N-methacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-isopropylacrylamide, N-n-propylacrylamide, N-isopropylmethacrylamide, N-n-propylmethacrylamide, N-acryloyloylpyrrolidine, N-methacryloylpyrrolidine, N-acryloylpiperidine, N-methacryloylpiperidine, N-acryloylhexahydroazepine, N-acryloylmorpholine and N-mathacryloylmorpholine.

Other suitable polymers include unsaturated and saturated polyesters including alkyd resins. The polyesters may be condensation polymers derived by the condensation of polybasic acids and anhydrides, such as dibasic acids or anhydrides, with polyols, such as dihydroxy or trihydroxy compounds. The polyesters may include in the polymeric chain, varying proportions of other saturated or aromatic dibasic acids and anhydrides which are or are not subject to cross-linking.

The unsaturated polyesters are prepared by reacting the one or more unsaturated polybasic acids or anhydrides with the polyols (di- or tri-hydroxy compounds) in approximately equal proportions. Examples of such polyesters include polyesters prepared from: maleic anhydride and propylene glycol (1:1 molar ratio); isophthalic acid, maleic anhydride and propylene glycol (1:2:3 and 1:1:2 molar ratios); and adipic acid, maleic anhydride and propylene glycol (1:2:3 molar ratio). A wide variety of polyester resins that can be used are commercially available.

Suitable polymers include epoxy resins. Epoxy resins include resins comprised of monomers, oligomers, and polymers containing one or more oxirane rings. A wide variety of such resins are available commercially. Such resins have either a mixed aliphatic-aromatic or an exclusively non-benzeneoid (i.e., aliphatic or cycloaliphatic) molecular structure. Representative examples of acceptable substituent groups include halogens, ester groups, ether groups, sulfonate groups, siloxane groups, nitro groups, and phosphate groups.

Epoxy resins are available from a wide variety of commercial sources. One group is known by the general trade designation "Epon" resins and are available from Shell Chemical Co. For example, "Epon 820" is an epoxy resin having an average molecular weight of about 380 and is prepared from 2,2-bis-(p-hydroxyphenyl)propane and epichlorohydrin. Similarly, "Epon 1031" is an epoxy resin having an average molecular weight of about 616 and is prepared from epichlorohydrin and symmetrical tetrakis-(p-hydroxyphenyl)ethane. "Epon 828" has a molecular weight of 350-400 and an epoxide equivalent of about 175-210.

Epoxy resins such as Araldite 6010, manufactured by Ciba-Geigy can also be utilized. These epoxy resins are of the glycidyl-type epoxide, and are preferably diglycidyl ethers of bis-phenol A which are derived from bisphenol and epichlorohydrin.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent. Another group of epoxy resins are available from Furane Plastics Inc., Los Angeles, Calif. under the general trade designations EPIBOND and EPOCAST. For example, EPI-BOND 100A is a one component epoxy resin powder available from Furane which is curable to a hard resin in the absence of any hardener.

Liquid forms of epoxy resin are also useful. These liquid forms normally comprise very viscous liquids requiring some degree of heating to permit withdrawal from storage containers. Certain "D.E.R." and "D.E.W." resins obtainable from Dow Chemical Company and "Epotuf" liquid epoxy resins obtainable from Reichhold Chemicals Inc. are examples of such resins preferred for employment in accordance with the invention. An example of an "Epotuf" liquid epoxy resin in the undiluted medium high viscosity #37-140 having an epoxide equivalent weight of 180-195, a viscosity (ASTM D445) of 11,000-14,000 cps at 25° C., and a Gardner Color Maximum of 3.

In some embodiments of the invention the epoxy resins may be "solubilized" by neutralization with a basic compound such as an organic amine. Examples of amines include amines and hydroxyamines including diethylamine, triethylamine, triethanolamine, dimethylethanolamine, etc. Epoxy resins also include polyamide modified epoxy resins, such as AF-42 from Minnesota Mining and Manufacturing Co.

Additional examples of the epoxy resins derived from amines include tetraglycidyldiaminodiphenylmethane, triglycidyl-p-aminophenol, triglycidyl-m-aminophenol and triglycidylaminocresol and their isomers, examples of the epoxy resins derived from phenols include bisphenol A epoxy resins, bisphenol F epoxy resins, bisphenol S epoxy resins, phenol-novolak epoxy resins, cresol-novolak epoxy resins and resorcinol epoxy resins, and examples of the epoxy resins whose precursors are compounds having a carbon-carbon double bond are alicyclic epoxy resins. Moreover, brominated epoxy resins prepared by brominating these epoxy resins can be used, but the present invention is not restricted to the use of these compounds. Furthermore, mixtures of two or more of the epoxy resins can be used and monoepoxy compounds can also be incorporated.

Generally, epoxy resins for use in the invention are compositions containing glycidyl ether monomers. Representative examples of these are the glycidyl ethers of polyhydric phenols obtained by reacting a polyhydric phenol with an excess of chlorohydric, such as epichlorohydrin. Specific examples of epoxy resins include 2,2-bis[4-(2,3-epoxypropoxy)phenyl]propane(diglycidyl ether of bisphenol A) and commercially available materials under the trade designation "Epon 828F", "Epon 1004F" and "Epon 1001 F" available from Shell Chemical Co., "DER-331", DER-332" and "DER-334" available from the Dow Chemical Co. Preferred is the diglycidyl ether of bisphenol A, "CMD 35201" available from Rhone Poulenc, Inc., Louisville, Ky. Other suitable epoxy resins include glycidyl ethers of phenol formaldehyde novolak resins (e.g., "DEN-431" and "DEN- 438" available from the Dow Chemical Co.), and resorcinol digylcidyl ether. Additional examples of epoxides are described in U.S. Pat. No. 3,018,262, incorporated herein by reference.

Epoxy resins further include UV curable epoxies and cycloaliphatic epoxy resins. UV curable epoxies and cycloaliphatic epoxy resins are available under the trade designation Cyracure® specificaly including products 6100, 6105, 6110, and 6351 from Union Carbide/Dow Chemical.

Suitable polymers include polyamides. In particular, the polymers may be an aliphatic or aromatic polyamides. Polyamides are commercially available. Examples of polyamides include those under the trade designations Zytel available from DuPont, Capron from AlliedSignal, Texapol from Hanna, Ashlene from Ashley, Ultramid from BASF, Durethan from Bayer, Grilamid from EMS, Vestamid from Huls America, Vydyne from Monsanto, Wellamid from Wellman and others.

Specific examples of polyamides include nylon 6 (polycaprolactam), nylon 6/6 (polyhexamethyleneadipamide), nylon 6/10 (condensation product of hexamethylenediamine and sebacic acid), nylon 6/12, nylon 6/T (polyhexamethylene terephthalamide), nylon 7 (polyenanthamide), nylon 8 (polycapryllactam), nylon 9 (polypelargonamide), nylon 10, nylon 11, nylon 12, nylon 55, nylon XD6 (poly methaxylylene adipamide), nylon 6/I, poly -alanine, NOMAX® 410 available from DuPont, polyamides under the trade designations PA 7030 and 5050 available from Dow, and Ultramid K1297/2 available from BASF.

Suitable polymers include polyimides. Polyimides can be prepared by reacting a diisocyanate with a dianhydride, or a dianhydride with an aromatic diamine (such as 3,3',4,4'-benzophenonetetracarboxylic dianhydride-co-4,4'-oxydianiline and methylenedianiline). Examples of polyimides include KAPTON and VESPEL available from DuPont.

Suitable polymers include polyetherimides. Polyetherimides are polymers containing ether and imide linkages. For example, polyetherimides can be prepared by reacting at least one diamine, such as m-phenylenediamine or p-phenylenediamine, with at least one ether dianhydride, such as 2,2-bis[(3,4-dicarboxyphenoxy)phenyl]propane dianhydride. Polyetherimides are commercially available. Examples of polyetherimides include those under the trade designation ULTEM-1000, ULTEM-4000 and ULTEM-6000 from General Electric, RTP 2101, 2103 and 2105 from RTP and Thermofil W-10FG0100, W-20FG0100 and W-30FG0100 from Thermofil. Polyetherimides also include silicone polyetherimides.

Suitable polymers also include polyamideimides. Polyamideimides may be prepared by condensing an imide and an amide. Polyamideimides are commercially available. Examples of polyamideimides include those under the trade designation TORLON™ available from Amoco and Lack E 3560/32 and 3561/27 available from Herberts Gmbh.

Suitable polymers include polyesterimides. Polyesterimides are commercially available. Examples of polyesteramides include TERBEC® 533 L-33 available from BASF, IMIDEX-E available from General Electric and those made according to U.S. Pat. Nos. 3,426,098 and 3,697,471 which are herein incorporated by reference.

Suitable polymers include polyesteramideimides. Polyesteramideimides are commercially available. Examples of polyesteramideimides include copolymers of any combination of a polyester, a polyamide and polyimide.

In one embodiment, polymer composites of the present invention contain from about 1% by weight to about 99.99% by weight of the polymer and from about 0.01% by weight to about 99% by weight of the metal chalcogenide nanocomposite. In another embodiment, the polymer composite contains a major amount of the polymer and a minor amount of the metal chalcogenide nanocomposite, and optionally a minor amount of additives such as coupling agents. A major amount means at least 50% by weight or more, while a minor amount means less than 50% by weight. In another embodiment, polymer composites of the present invention contain from about 20% by weight to about 99.9% by weight of the polymer and from about 0.1% by weight to about 80% by weight of the metal chalcogenide nanocomposite. In yet another embodiment, polymer composites of the present invention contain from about 70% by weight to about 99% by weight of the polymer and from about 1% by weight to about 30% by weight of the metal chalcogenide nanocomposite.

The polymer composite is made by combining suitable amounts of the polymer and the metal chalcogenide nanocomposite. If the metal chalcogenide nanocomposite is stored in a dry state, it can be combined with an organic solvent and/or water before combined with the polymer. The polymer is preferably in a liquid or semi-liquid state. The polymer and the metal chalcogenide nanocomposite are mixed to facilitate uniform distribution of the metal chalcogenide nanocomposite within the polymer. In one specific embodiment, the metal chalcogenide nanocomposite powder (stored in a dry state) is combined with a polymer or prepolymer powder, and the mixture is then melted and molded or extruded.

After combining and mixing suitable amounts of the polymer and the metal chalcogenide nanocomposite, the mixture is then cured, molded, extruded, formed, or subjected to suitable polymer processing to form a polymer composite having metal chalcogenide nanocomposite substantially uniformly dispersed therein. In the case of a translucent polymer, for example a polyacrylate, the resultant polymer composite is also translucent, indicating that the metal chalcogenide nanocomposites are dispersed on a nanoscale. Polymer composites are generally smooth, further indicating that the metal chalcogenide nanocomposites are dispersed on a nanoscale.

The present invention further provides methods of improving certain properties in polymer compositions, such as one or more of methods of improving strength, methods of improving corona resistance, methods of improving plasma resistance, methods of improving resistance to organic solvents, methods of improving high temperature stability, methods of improving flame retardancy, methods of improving oxidative stability, methods of modifying refractive index, methods of improving fracture properties, methods of improving abrasion resistance, methods of improving liquid permeability, methods of improving gas permeability including methods of improving gas permeability to specific gases, methods of improving (low) hysteresis loss (low rolling resistance), methods of improving corrosion protection, and methods of improving field responsive capability. The methods of improving certain properties in polymer compositions is accomplished by incorporating the metal chalcogenide nanocomposites into a polymer system.

The following examples illustrate the present invention. Unless otherwise indicated in the following examples and elsewhere in the specification and claims, all parts and percentages are by weight, all temperatures are in degrees Centigrade, RT is room temperature, and pressure is at or near atmospheric pressure.

EXAMPLES 1-5

Examples 1-5 show the preparation of metal oxide sols containing metal chalcogenide precursors. Five sol samples are prepared by following the procedure described below: (1) preparation of a mixture of metal alkoxide and methoxyethanol in a vial; (2) addition of metal acetate and stir until homogenized; (3) addition of phenyltrimethoxysilane followed by stirring for 1 hr at RT; (4) addition of boric acid followed by stirring for 3 hr at RT; (5) addition of water followed by stirring overnight; (6) removal of volatile compounds followed by vacuum dry overnight. Table 1 lists concentrations of each component. The resulting dry sol powders are colorless for samples 1, 2, and 5, blue for sample 4, and light brown for sample 3.

TABLE 1

| | Sample No | | | | |
|---|---|---|---|---|---|
| | 1 | 2 | 3 | 4 | 5 |
| Titanium isopropoxide g (mmol) | 0.296 (1.03) | 0.299 (1.05) | 0.213 (0.74) | 0.252 (0.88) | 0.251 (0.88) |
| Phenyltrimethoxysilane g (mmol) | 0.287 (1.45) | 0.289 (1.46) | 0.228 (1.15) | 0.25 (1.26) | 0.248 (1.24) |
| Boric acid g (mmol) | 0.091 (1.44) | 0.09 (1.43) | 0.063 (1.0) | 0.078 (1.24) | 0.078 (1.24) |
| Cadmium acetate g (mmol) | 0.02 (0.09) | 0 | 0 | 0 | 0 |
| Lead acetate, g (mmol) | 0 | 0.031 (0.08) | 0 | 0 | 0 |
| Silver acetate, g (mmol) | 0 | 0 | 0.008 (0.05) | 0 | 0 |
| Copper acetate, g (mmol) | 0 | 0 | 0 | 0.016 (0.09) | 0 |
| Zinc acetate, g (mmol) | 0 | 0 | 0 | 0 | 0.015 (0.08) |
| Water g (mmol) | 0.039 (2.17) | 0.039 (2.17) | 0.031 (1.72) | 0.034 (1.89) | 0.034 (1.89) |
| Methoxyethanol, ml | 0.52 | 0.53 | 0.41 | 0.52 | 0.73 |

EXAMPLE 6

Example 6 describes the preparation of metal sulfide nanoparticles by exposing the sol powders to $H_2S$. The fine sol powders prepared in Example 1-5 (10 mg/each) are exposed to $H_2S$ (produced from $Na_2S$ and HCl in water) in a sealed plastic bag overnight. The exposed powders turned their colors to yellow for sample 1 and to brown for samples 2-4. When they are dissolved in methoxyethanol, the colors of the solutions are yellow for sample 1 and 4, colorless for sample 2 and 5, and brown for sample 3.

EXAMPLE 7

Example 7 describes the preparation of metal sulfide nanoparticles by treating the sol solutions with $H_2S$. The sol powders prepared in Examples 1-5 (21 mg/each) are respectively dissolved in methoxyethanol (0.5 ml). When $H_2S$ carried by $N_2$ is bubbled through the solutions, they quickly turn their colors to yellow for sample 1 and to brown for samples 2-4. Although sample 5 remains colorless, it exhibits a blue emission when exposed to UV light. Colored precipitates are also formed for samples 1-4. The precipitates collected are found to be fully soluble in N-methylpyrrolidinone (NMP) and provided clear colored solutions, respectively. They remain clear for over a month.

EXAMPLE 8

Example 8 describes the preparation of metal sulfide nanoparticles by reacting in NMP. The sol powders prepared in Examples 1-5 (21 mg/each) are dissolved in NMP (0.3 ml). Treatment with $H_2S$ /$N_2$ quickly turns their colors to yellow for sample 1 and 2, to brown for sample 3, and to green for sample 4 (suggesting predominant formation of CuS). No color changes are observed for sample 5. All samples remain clear and no formation of precipitates is observed even aged for over a few months.

EXAMPLE 9

Example 9 describes the preparation of metal sulfide nanoparticles by reacting in the presence of mercaptosilane. The metal oxide sol powders prepared in Examples 1-4 (21 mg/each) are respectively dissolved in methoxyethanol (0.5 ml) to obtain clear solutions. They are first treated with mercaptopropyltrimethoxysilane (0.45 mg) overnight. Subsequent treatment with $H_2S$ pre-dissolved in methoxyethanol immediately generates the corresponding metal sulfide nanoparticles. The colors of the solutions are yellow for sample 1 and brown for samples 2-4. They are stable and remain clear for over a month without precipitation.

EXAMPLE 10

Example 10 describes the preparation of epoxy/AgS nanocomposite. One-half of the metal oxide sol solution containing AgS nanoparticles prepared in Example 9 is first dried (air-dry at 60° C.+vacuum dry overnight) to generate brown powder. The powder is then mixed with UVR6105 (cycloaliphatic epoxy from Dow Chem, 0.45 g), bisphenol A propoxylate/ethoxylate (0.1 g) and glycidoxypropyltrimethoxysilane (product number Z6040 from Dow Corning Corporation, 0.5 mg). The mixture is poured on a glass plate and cured at 80° C./1 hr and 140° C./2 hrs. The resulting brown film exhibits excellent transparency, indicating uniform distribution of the nanoparticles.

EXAMPLE 11

Example 11 describes the preparation of metal sulfide nanoparticles by reacting with heat-treated sol precursor. The metal oxide sol powders prepared in Examples 1 and 4 are heat-treated in an oven at 135° C. for 1 hr. They are then dissolved in methoxyethanol, respectively. Slow addition of $H_2S$/methoxyethanol solution results in the formation of clear yellow solutions. The dispersed nanoparticles are stable and the solutions remain clear for over a few months without precipitation.

EXAMPLES 12-14

Examples 12-14 describe the preparation of sol powders. The following three sols are prepared as described below: (1) preparation of a mixture of metal alkoxide and methoxyethanol in a vial; (2) addition of phenyltrimethoxysilane followed by stirring for 1 hr/RT; (3) addition of boric acid followed by stirring for 1 hr/RT; (4) addition of water followed by stirring overnight /RT; (5) removal of volatile compounds followed by vacuum dry overnight. Table 2 lists concentrations of components.

TABLE 2

| Ex No | Metal alkoxide g (mmol) | Phenyltrimethoxysilane g (mmol) | Boric acid g (mmol) | Water g (mmol) | Methoxyethanol ml |
|---|---|---|---|---|---|
| 12 | [(CH$_3$)$_2$CH]$_3$Al, 0.93 (4.6) | 0.99 (5) | 0.31 (5) | 0.15 (8) | 4 |
| 13 | [(CH$_3$)$_2$CH]$_4$Ti, 1.54 (5.4) | 1.43 (7.2) | 0.45 (7.2) | 0.2 (11) | 5 |
| 14 | 80%[CH$_3$(CH$_2$)$_3$]$_4$Zr, 2.1 (4.4) | 1.16 (5.9) | 0.36 (5.8) | 0.17 (9.4) | 4 |

EXAMPLE 15

Example 15 describes the preparation of CdS nanoparticles hosted by metal oxide sols. The sol powders prepared in Examples 12-14 (18 mg/each) are dissolved in methoxyethanol (0.5 ml), respectively. Cadmium acetate (0.6 mg/each) is added and the solutions are further stirred until they become homogeneous. The solutions are then treated with mercaptopropyltrimethoxysilane (0.45 mg) overnight. Finally, they are reacted with H$_2$S/methoxyethanol to give clear yellow solutions, exhibiting the formation of CdS nanoparticles hosted by metal oxide sols.

EXAMPLE 16

Example 16 describes the preparation of epoxy/CdS nanocomposites. The CdS nanoparticles prepared in Example 15 are respectively mixed with UVR6105(cycloaliphatic epoxy from Dow Chem, 0.45 g), bisphenol A propoxylate/ethoxylate (0.1 g) and Z6040 (0.5 mg). The mixtures are poured on a glass plate, heated to 50° C. to remove volatile compounds, and then cured at 80° C./1 hr and 140° C./2 hrs. In all cases, the resulting yellow films exhibit excellent transparency.

EXAMPLE 17

Example 17 describes the preparation of PbS nanoparticles hosted by metal oxide sol. The metal oxide sol in Example 14 (19 mg) is mixed with lead acetate trihydrate (0.8 mg) in methoxyethanol (0.5 ml). After obtaining a clear solution, it is then treated with mercaptopropyltrimethoxysilane (0.45 mg) overnight. The colorless clear solution is then reacted with H$_2$S/methoxyethanol to quickly produce PbS nanoparticles. The resulting solution is transparent brown.

EXAMPLE 18

Example 18 describes the preparation of CdS/ZnS mixed nanoparticles hosted by metal oxide sol. The metal oxide sol prepared in Example 13 (23 mg) is mixed with cadmium acetate (0.7 mg) and Zn acetate (0.7 mg) in methoxyethanol (0.5 ml). After obtaining a clear solution, it is then treated with mercaptopropyltrimethoxysilane (0.6 mg) overnight. The solution is then reacted with H$_2$S/methoxyethanol to produce CdS/ZnS mixed nanoparticles. The resulting solution is transparent yellow.

EXAMPLE 19

Example 19 describes the preparation of CdSe nanoparticles hosted by metal oxide sol. The dried metal oxide sol prepared in Example 12 (20 mg) and cadmium acetate (1.6 mg) is dissolved in NMP (0.5 ml). The solution is then reacted with H$_2$Se (prepared from Al$_2$Se$_3$ and HCl in water) carried by N$_2$, which resulted in the formation of red precipitates. Filtration gives a lightly yellowish clear solution, which emits a blue hue when exposed to UV light. The red precipitates collected are suspended in NMP. After addition of octyltrimethoxysilane (4 mg), the mixture is stirred overnight /RT and 150° C./4 hrs to gradually dissolve most of the precipitates. Filtration gives a clear red solutition that exhibits a broad UV-Vis absorption starting at 600 nm. The solution remains clear for over a month without precipitation.

EXAMPLE 20

Example 20 describes the preparation of CdSe nanoparticles. The metal oxide sol prepared in Example 1 (20 mg) is dissolved in methoxyethanol and treated with mercaptopropyltrimethoxysilane (0.45 mg) overnight. Treatment with H$_2$Se (prepared from Al$_2$Se$_3$ and HCl in water) carried by N$_2$ results in the formation of slightly yellowish solution along with yellow precipitates. Filtration gives a clear light yellow solution that emits a blue color when exposed to UV light. The solution remains clear for over a month without precipitation.

EXAMPLE 21

Example 21 describes the preparation of ZnSe nanparticles. The metal oxide sol prepared in Example 5 is treated as described in Example 20. The reaction with H$_2$Se results in the formation of colorless solution with pink precipitates. Filtration gives a clear colorless solution that emits a blue color when exposed to UV light. The solution remains clear for over a month without precipitation.

EXAMPLE 22

Example 22 describes the preparation of m CdSe nanoparticles by the use of Al$_2$Se$_3$. The metal oxide sol prepared in Example 12 (20 mg) and cadmium acetate (0.8 mg) is dissolved in NMP (0.5 ml). It is first treated with Al$_2$Se$_3$ (0.6 mg) at RT/overnight and then with phenylsilane (3 mg) at RT/overnight and 150° C./4 hrs. Filtration gives a clear orange colored solution that emits a yellow color when exposed to blue or UV light. The solution remains clear for over a month without precipitation.

EXAMPLE 23

Example 23 describes the preparation of CdTe nanoparticles by the use of Al$_2$Te$_3$. The metal oxide sol prepared in Example 12 (20 mg) and cadmium acetate (0.8 mg) are dissolved in NMP (0.5 ml). It is first treated with Al$_2$Te$_3$ (0.7 mg) at RT/overnight and then with phenylsilane (3 mg) at RT/overnight and 150° C./4 hrs. Filtration gives a clear orange solution that emits an orange color when exposed to UV light or blue light.

EXAMPLE 24

Example 24 describes the preparation of CdS nanoparticles by the use of thioacetamide. The sol powder (0.01 g) prepared in Example 1 is dissolved in NMP (0.3 ml). After addition of thioacetamide (0.7 mg), the solution is stirred overnight, resulting in the formation of a clear yellow solution. The solution remains clear even after it is allowed to stand for a month at RT.

EXAMPLE 25

Example 25 describes the preparation of metal oxide sols containing cadmium-chalcogenide precursor by the use of octyltrimethoxysilane. To a solution of titanium isopropoxide (0.314 g, 1.1 mmol) in methoxyethanol (1.5 ml) is added cadmium acetate (0.021 g, 0.09 mmol) and stirred until the solution becomes clear. After addition of octyltriethoxysilane (0.44 g, 1.6 mmol) and boric acid (0.098 g, 1.5 mmol), the solution is stirred overnight. Addition of water is followed by stirring overnight which gives an opaque solution. Evaporation of volatile compounds under vacuum gives colorless powders (yield 0.417 g).

EXAMPLE 26

Example 26 describes the preparation of CdS nanoparticles and acrylate/CdS nanocomposite. The sol powder (18 mg) prepared in Example 25 is heat-treated at 120° C./1 hr and then dissolved in xylene/methoxyethanol (3/1) to obtain a clear colorless solution. Treatment with $H_2S$/methoxyethanol quickly generates a bright yellow solution. After removal of volatile compounds, the resulting yellow residue is combined with isobornyl acrylate (0.2 g), propoxylated trimethylolpropane triacrylate (0.04 g) and benzil dimethyl ketal (2 mg). The solution is cast on a glass plate and UV-cured to give a transparent yellow film.

EXAMPLE 27

Example 27 describes the preparation of CdSe nanoparticles. The sol powder (15 mg) prepared in Example 25 is dissolved in xylene/methoxyethanol (3/1) and treated with 3-mercaptopropyltrimethoxysilane (0.45 mg). It is subsequently treated with $H_2Se$ carried by $N_2$ to give a clear orange-yellow solution. The solution remains clear even after a month at RT, exhibiting formation of a stable dispersion of CdSe nanoparticles.

EXAMPLE 28

Example 28 describes the preparation of CdS nanoparticles hosted by metal oxide sol. Cadmium acetate (0.022 g, 0.096 mmol) is first dissolved in a solution of aluminum tributoxide (0.232 g, 0.94 mmol) in methoxyethanol (0.5 g). Subsequently, a solution of boric acid (0.058 g, 0.94 mmol) in methoxyethanol (0.4 g) is added. The resulting solution is then stirred overnight to obtain a milky solution. Addition of octyltriethoxysilane (0.261 g, 0.94 mmol) and water (0.028 g, 1.6 mmol) followed stirring at RT/overnight and at 120° C./6 hrs gives a clear colorless solution. The volatiles are removed and the resulting residues are treated with methanol (0.5 g) by refluxing for ½ hr. The precipitates collected after centrifuge separation are again treated with methanol in the same manner. The precipitates are collected and then dried at 110° C. for 1 hr in an oven to give a colorless powder (0.27 g). FTIR analysis of the powder clearly exhibits the disappearance of a strong band at 1380 $cm^{-1}$ assigned to B-O stretching, indicating the removal of boron components (probably as volatile trimethyl borate) by methanol treatment. The sol powder (44 mg) thus obtained is first dissolved in xylene (0.5 g), stirred at 80° C./1 hr after addition of 3-mercaptopropyltrimethoxysilane (1.3 mg), and then mixed with methylthioamide (1 mg) overnight at RT. The resulting clear yellow solution is cast film on a glass plate exhibits a bright orange emission when exposed to UV in the dark. The CdS nanoparticles hosted by metal oxide sol can be stored as a dried powder form for a long period of time that can be re-dissolved in an organic solvent to form a clear solution with a bright orange emission under UV.

EXAMPLE 29

Example 29 describes the preparation of CdS nanoparticles hosted by metal oxide sol. Cadmium acetate (0.03 g, 0.13 mmol) is added to a solution of aluminum tributoxide (0.219 g, 0.89 mmol) in methoxyethanol (0.5 g). The solution is then stirred overnight. A solution of boric acid (0.008 g, 0.13 mmol) in methoxyethanol (0.052 g) is added and the solution is further stirred at 120° C. for 2 hrs. A drop of water/methoxyethanol (1:1, ~0.016 mg) is added after cooling to RT and the resulting solution is stirred at RT/½ hr and 120° C./1 hr. The process is repeated six times to obtain a milky solution. Addition of octyltriethoxysilane (0.247 g, 0.89 mmol) followed by stirring at RT/overnight and at 120° C./5 hr gives a clear solution. After removing the volatiles, the residues are treated with methanol to remove boron components (as described in Example 28) and then heat-treated at 110° C./1 hr to give a colorless powder (0.24 g). The dried sol (17 mg) is dissolved in xylene (0.3 g), stirred at 80° C./1 hr after addition of 3-mercaptopropyltrimethoxysilane (0.84 mg), and then mixed with methylthioamide (0.48 mg) overnight at RT. The resulting clear yellow solution as well as its cast film exhibits a bright yellow emission when exposed to UV in the dark. The CdS/sol system can be stored as a dried powder form for a long period of time that can be re-dissolved in an organic solvent to form a clear solution with a bright yellow emission under UV.

EXAMPLE 30

Example 30 describes the preparation of CdS nanoparticles hosted by metal oxide sol. To a solution of alumunum tributoxide (0.145 g, 0.59 mmol) in methoxyethanol (0.3 g) is added a solution of boric acid (0.073 g, 1.18 mmol) in methoxyethanol (0.6 g). The mixture is stirred at RT/1 hr and 120° C./2 hrs to obtain a milky solution. The mixture is then treated with octyltriethoxysilane (0.07 g, 0.25 mmol) at 120° C./3 hr. After removing the volatiles, the residues are treated with methanol 2 times to remove boron components and heat-treated at 110° C./1 hr to give colorless powder (0.11 g). A mixture of the dried sol powder (17 mg) and cadmium acetate (1.6 mg, 0.007 mmol) in methoxyethanol (0.4 g) is heated to 120° C. for 2 hrs. After removing the volatiles, the residues are dissolved in xylene (0.4 g), stirred at 80° C./1 hr in the presence of 3-mercaptopropyltrimethoxysilane ((0.43 g, 0.0022 mmol), and then mixed with methoxythioacetamide (0.33 mg, 0.0043 mmol) overnight. The resulting clear yellow solution exhibits a bright orange emission when exposed to UV in the dark. The CdS/sol system remains clear without changing its emission color even six months after the preparation.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A metal chalcogenide nanocomposite made by chalcogenizing a host-guest metal oxide sol,
   wherein the host-guest metal oxide sol made by mixing:
      from about 0.01% to about 80% by weight of at least one guest metal chalcogenide precursor; and
      from about 20% to about 99.99% by weight of a host metal oxide sol made by mixing:
         at least one metal oxide, wherein the metal is a transition metal, a post-transition metal, an alkali metal, or alkaline earth metal;
         at least one organosilane;
         at least one boron oxide compound selected from the group consisting of boric acid, alkoxy boron compounds, hydrocarbyl boric acids, hydrocarbyl hydroxy boron alkoxides, and hydroxy boron alkoxides; and
         a liquid.

2. The metal chalcogenide nanocomposite of claim 1, wherein the guest metal chalcogenide precursor comprises at least one metal atom selected from the group consisting of zero-valent metal, metal alkoxides, metal carboxylates, metal hydroxides, metal nitrates, metal halides, metal sulfates and chelated metals.

3. The metal chalcogenide nanocomposite of claim 1, wherein the guest metal chalcogenide precursor comprises at least one metal atom selected from the group consisting of aluminum, antimony, arsenic, barium, beryllium, bismuth, cadmium, calcium, cerium, chromium, cobalt, copper, dysprosium, erbium, europium, gadolinium, gallium, gold, hafnium, holmium, indium, iridium, iron, lanthanum, lead, lithium, lutetium, magnesium, manganese, mercury, molybdenum, neodymium, nickel, niobium, osmium, palladium, platinum, potassium, praseodymium, rhenium, rhodium, rubidium, ruthenium, samarium, scandium, silver, strontium, tantalum, technetium, terbium, titanium, thallium, thorium, thulium, tin, tungsten, uranium, vanadium, ytterbium, yttrium, zinc, and zirconium.

4. The metal chalcogenide nanocomposite of claim 1, wherein the guest metal chalcogenide precursor at least one selected from the group consisting of antimony acetate, arsenic ethoxide, barium acetate, beryllium acetylacetonate, bismuth t-pentoxide, cadmium acetate, cobalt acetate, copper acetate, copper ethoxide, chromium acetate, cerium methoxyethoxide, erbium acetylacetonate, europium acetylacetonate, gadolinium acetylacetonate, gallium ethoxide, gold hydroxide, gold chloride, gallium ethoxide, hafnium n-butoxide, indium methoxyethoxide, lanthanum isopropoxide, lithium t-butoxide, lead acetate, manganese methoxide, mercury acetate, molybdenylacetylacetonate, neodymium methoxyethoxide, nickel acetate, niobium butoxide, palladium acetylacetonate, praseodymium acetylacetonate, rhodium acetylacetonate, rubidium acetylacetonate, samarium isopropoxide, scandium acetylacetonate, strontium isopropoxide, platinum acetylacetonate, silver acetate, silver nitrate, strontium acetate, tantalum ethoxide, terbium acetoacetate, thalium ethoxide, thulium acetoacetate, tin acetoacetonate, tungsten ethoxide, vanadylacetylacetonate, ytterbium acetylacetonate, yttrium acetate, zinc acetate, $Cr(CO)_6$, $Mn_2(CO)_{10}$, $Mo(CO)_6$, $W(CO)_6$, and platinum-1,3-divinyl-1,1,3,3,-tetramethyldisiloxane.

5. The metal chalcogenide nanocomposite of claim 1, wherein the metal chalcogenide nanocomposite comprises at least one selected from the group consisting of AuS, AuSe, AuTe, AgS, AgSe, AgTe, PtS, PtSe. PtTe, PdS, PdSe, PdTe, IrS, IrSe, IrTe, ReS, ReSe, ReTe, HgS, HgSe, HgTe, RuS, RuSe, RuTe, RhS, RhSe, RhTe, CuS, CuSe, CuTe, OsS, OsSe, OsTe, FeS, FeSe, FeTe, CoS, CoSe, CoTe, VS, VSe, VTe, CrS, CrSe, CrTe, MnS, MnSe, MnTe, MoS, MoSe, MoTe, NiS, NiSe, NiTe, ZnS, ZnSe, ZnTe, CdS, CdSe, CdTe, NbS, NbSe, NbTe, TcS, TcSe, TcTe, WS, WSe, WTe, SbS, SbSe, SbTe, BaS, BaSe, BaTe, EuS, EuSe, EuTe, GdS, GdSe, GdTe, GaS, GaSe, GsTe, InS, InSe, InTe, LaS, LaSe, LaTe, PbS, PbSe, PbTe, NdS, NdSe, NdTe, PrS, PrSe, PrTe, SmS, SmSe, SmTe, SrS, TaS, TaSe, TaTe, SrSe, SrTe, TaS, TaSe, TaTe, SnS, SnSen SnTe, YbS, YbSe, YbTe, YS, YSe, and YTe.

6. The metal chalcogenide nanocomposite of claim 1, wherein
   the metal oxide is selected fmm the group consisting of aluminum triethoxide, aluminum isopropoxide, aluminum sec-butoxide, aluminum tri-t-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium (triethanolaminato)isopropoxide, titanium bis(ethylacetoacetato)diisopropoxide, titanium bis(2,4-pentanedionate)diisopropoxide, zirconium ethoxide, zirconium isopropoxide, zirconium propoxide, zirconium sec-butoxide, zirconium t-butoxide, aluminum di-s-butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxlde, titanium n-nonyloxide, vanadium tri-n-propoxide oxide, vanadium triisobutoxide oxide, iron ethoxide, tungsten ethoxide, samarium isopropoxide, iron isopropoxide, cobalt mettioxyethoxide, and lanthanlum methoxyethoxide;
   the organosilane comprises an organotunctional silane represented by Formula III:

$$(R^2)_{4-c}Si(X^2)_c \quad \text{(III)}$$

wherein c is 1 to 4, each $X^2$ is individually an alkoxy group containing from 1 to about 4 carbon atoms, and each $R^2$ is individually a hydrogen or an organofunctional containing organic group containing from about 1 to about 24 carbon atoms including at least one from the group consisting of heterocyclic, acryloxy, cyano, phosphino, amino, amide, vinyl, epoxy, glycidoxy, alkyl, a carbon carbon triple bond containing group, mercapto, siloxy, halocarbon, and a carbon carbon double bond containing group; and
   the boron oxide compound is selected from the group consisting of boric acid, boron tri-n-butoxide, boron tri-sec-butoxide, boron tn-t-butoxide, boron triisopropoxide, boron tri-n-propoxide, boron trimethoxide, boron triethoxide, hydroxy boron diisopropoxide, hydroxy boron diethoxide, hydroxy boron dimethoxide, hydroxy boron dibutoxide, dihydroxy boron isopropoxide, dihydroxy boron ethoxide, dihydroxy boron methoxide, dihydroxy boron butoxide, phenylboronic acid, 3-acetyiphenylboronic acid, 4-acetylphenylboronic acid, 5-chlorothiophene-2-boronic acid, 1,4-phenylenebis(boronic acid), (2-carboxyphenyl)boronic acid, (3-carboxyphenyl)boronic acid, (4-carboxyphenyl)boronic acid, (3,4-methylenedioxyphenyl)boronic acid, 4-methylthio)phenylboronic acid, naphthalene-1-boronic acid, naphthalene-2-boronic acid, 8-quinolineboronic acid, benzothiophene-2-boronic acid, (2-acetylaminophenyl)boronic acid, (3-acetylaminophenyl)boronic acid, 4-acetylaminophenyl)boronic acid, (3-methoxycarbonylphenyl)boronic acid, (4-methoxycarbonylphenyl)boronic acid, and (4-methyl-1-naphthalene)boronic acid.

7. The metal chalcogenide nanocomposite of claim 1, wherein the liquid is water and an organic solvent.

8. The metal chalcogenide nanocomposite of claim 1, wherein the host metal oxide sol composition is made by mixing from about 15% to about 70% by weight of at least one metal alkoxide, from about 10% to about 75% by weight of at least one organosilane, and from about 0.5% to about 40% by weight of at least one boron oxide compound.

9. The metal chalcogenide nanocomposite of claim 1, wherein chalcogenization is carried out by contacting the host-guest metal oxide sol with a chalcogenizing agent.

10. The metal chalcogenide nanocomposite of claim 9, wherein the chalcogenizing agent is a sulfurization agent, selenization agent, or tellurization agent.

11. The metal chalcogenide nanocomposite of claim 9, wherein the chalcogenizing agent is $H_2S$, $H_2Se$, or $H_2Te$.

12. The metal chalcogenide nanocomposite of claim 9, wherein the chalcogenizing agent is labile metal chalcogenide or elemental chalcogen.

13. The metal chalcogenide nanocomposite of claim 9, wherein the chalcogenizing agent is selected from the group consisting of $Al_2S_3$, $Al_2Se_3$, $Al_2Te_3$, $Na_2S$, $Na_2Se$, $Na_2Te$, CaS, CaSe, CaTe, FeS, FeSe, FeTe, $TiS_2$, $TiSe_2$, $TiTe_2$, $ZrS_2$, $ZrSe_2$, $ZrTe_2$, $B_2S_3$, $B_2Se_3$, $B_2Te_3$, S, Se, Te, thioamide, thioacetamide, thiourea, bis-(trimethylsilylsulfide), and carbon disulfide.

14. A metal chalcogenide nanocomposite made by mixing:
from about 0.01% to about 80% by weight of at least one metal chalcogenide; and
from about 20% to about 99.99% by weight of a host metal oxide sol made by mixing:
at least one metal oxide, wherein the metal is a transition metal, a post-transition metal, an alkali metal, or alkaline earth metal;
at least one organosilane;
at least one boron oxide compound selected from the group consisting of boric acid, alkoxy boron compounds, hydrocarbyl boric acids, hydrocarbyl hydroxy boron alkoxides, and hydroxy boron alkoxides; and
a liquid.

15. A dried metal chalcogenide nanocomposite, comprising:
from about 0.01% to about 80% by weight of at least one metal chalcogenide; and
from about 20% to about 99.99% by weight of a host metal oxide sol composition, comprising:
from about 15% to about 70% by weight of at least one metal oxide, wherein the metal is a transition metal, a post-transition metal, an alkali metal, or alkaline earth metal;
from about 10% to about 75% by weight of at least one organosilane; and
from about 0.5% to about 40% by weight of at least one boron oxide compound,
wherein the dried metal chalcogenide nanocomposite comprises less than about 0.5% by weight water.

16. The dried metal chalcogenide nanocomposite of claim 15, wherein the metal chalcogenide comprises at least one selected from the group consisting of AuS, AuSe, AuTe, AgS, AgSe, AgTe, PtS, PtSe, PtTe, PdS, PdSe, PdTe, IrS, IrSe, IrTe, ReS, ReSe, ReTe, HgS, HgSe, HgTe, RuS, RuSe, RuTe, RhS, RhSe, RhTe, CuS, CuSe, CuTe, OsS, OsSe, OsTe, FeS, FeSe, FeTe, CoS, CoSe, CoTe, VS, VSe, VTe, CrS, CrSe, CrTe, MnS, MnSe, MnTe, MoS, MoSe, MoTe, NiS, NiSe, NiTe, ZnS, ZnSe, ZnTe, CdS, CdSe, CdTe, NbS, NbSe, NbTe, TcS, TcSe, TcTe, WS, WSe, WTe, SbS, SbSe, SbTe, BaS, BaSe, BaTe, EuS, EuSe, EuTe, GdS, GdSe, GdTe, GaS, GaSe, GsTe, InS, InSe, InTe, LaS, LaSe, LaTe, PbS, PbSe, PbTe, NdS, NdSe, NdTe, PrS, PrSe, PrTe, SinS, SmSe, SmTe, SrS, TaS, TaSe, TaTe, SrSe, SrTe, TaS, TaSe, TaTe, SnS, SnSen SnTe, YbS, YbSe, YbTe, YS, YSe, and YTe.

17. The dried metal chalcogenide nanocomposite of claim 15, wherein the dried metal chalcogenide nanocomposite comprises less than about 0.1% by weight water.

18. The dried metal chalcogenide nanocomposite of claim 15, wherein the dried metal chalcogenide nanocomposite comprises less than about 0.05% by weight water.

19. A metal chalcogenide nanocomposite made by chalcogenizing a host-guest metal oxide sol,
wherein the host-guest metal oxide sol made by mixing:
from about 0.01% to about 80% by weight of at least one guest metal chalcogenide precursor; and
from about 20% to about 99.99% by weight of a host metal oxide sol made by mixing:
at least one transition metal oxide:
at least one organosilane;
at least one boron oxide compound selected from the group consisting of boric acid, alkoxy boron compounds, hydrocarbyl boric acids, hydrocarbyl hydroxy boron alkoxides, and hydroxy boron alkoxides; and
a liquid.

20. The metal chalcogenide nanocomposite of claim 19, wherein the guest metal chalcogenide precursor comprises at least one metal atom selected from the group consisting of aluminum, antimony, arsenic, barium, beryllium, bismuth, cadmium, calcium, cerium, chromium, cobalt, copper, dysprosium, erbium, europium, gadolinium, gallium, gold, hafnium, holmium, indium, iridium, iron, lanthanum, lead, lithium, lutetium, magnesium, manganese, mercury, molybdenum, neodymium, nickel, niobium, osmium, palladium, platinum, potassium, praseodymium, rhenium, rhodium, rubidium, ruthenium, samarium, scandium, silver, strontium, tantalum, technetium, terbium, titanium, thallium, thorium, thulium, tin, tungsten, uranium, vanadium, ytterbium, yttrium, zinc, and zirconium.

21. The metal chalcogenlde nanocomposite of claim 19, wherein the liquid is water and an organic solvent.

22. The metal chalcogenide nanocomposite of claim 19, wherein chalcogenization is carried out by contacting the host-guest metal oxide sol with a chalcogenizing agent.

23. The metal chalcogenide nanocomposite of claim 22, wherein the chalcogenizing agent is a sulfurization agent, selenization agent, or tellurization agent.

24. A dried metal chalcogenide nanocomposite, comprising:
from about 0.01% to about 80% by weight of at least one metal chalcogenide; and
from about 20% to about 99.99% by weight of a host metal oxide sol composition, comprising:
from about 15% to about 70% by weight of at least one transition metal oxide;
from about 10% to about 75% by weight of at least one organosilane; and
from about 0.5% to about 40% by weight of at least one boron oxide compound,
wherein the dried metal chalcogenide nanocomposite comprises less than about 0.5% by weight water.

25. The dried metal chalcogenide nanocomposite of claim 24, wherein the metal chalcogenide comprises at least one selected from the group consisting of AuS, AuSe, AuTe, AgS, AgSe, AgTe, PtS, PtSe, PtTe, PdS, PdSe, PdTe, IrS, IrSe, IrTe, ReS, ReSe, ReTe, HgS, HgSe, HgTe, RuS, RuSe, RuTe, RhS, RhSe, RhTe, CuS, CuSe, CuTe, OsS, OsSe, OsTe, FeS, FeSe, FeTe, CoS, CoSe, CoTe, VS, VSe, VTe, CrS, CrSe, CrTe, MnS, MnSe, MnTe, MoS, MoSe, MoTe, NiS, NiSe, NiTe, ZnS, ZnSe, ZnTe, CdS, CdSe, CdTe, NbS, NbSe, NbTe, TcS, TcSe, TcTe, WS, WSe, WTe, SbS, SbSe, SbTe, BaS, BaSe, BaTe, EuS, EuSe, EuTe, GdS, GdSe, GdTe, GaS, GaSe, GsTe, InS, InSe, InTe, LaS, LaSe, LaTe, PbS, PbSe, PbTe, NdS, NdSe, NdTe, PrS, PrSe, PrTe, SmS, SmSe, SmTe, SrS, TaS, TaSe, TaTe, SrSe, SrTe, TaS, TaSe, TaTe, SnS, SnSen SnTe, YbS, YbSe, YbTe, YS, YSe, and YTe.

26. The dried metal chalcogenide nanocomposite of claim 24, wherein the dried metal chalcogenide nanocomposite comprises less than about 0.1% by weight water.

27. The dried metal chalcogenide nanocomposite of claim 24, wherein the dried metal chalcogenide nanocomposite comprises less than about 0.05% by weight water.

28. The dried metal chalcogenide nanocomposite of claim 24, wherein the transition metal oxide comprises a transition metal alkoxide.

29. The dried metal chalcogenide nanocomposite of claim 24, wherein the boron oxide compound comprises boric acid.

* * * * *